US012671121B2

(12) United States Patent
Bauer

(10) Patent No.: US 12,671,121 B2
(45) Date of Patent: Jun. 30, 2026

(54) TRACTION BATTERY FOR AN ELECTRICALLY OR SEMI-ELECTRICALLY DRIVEN VEHICLE

(71) Applicant: Dr. Ing. h.c. F. Porsche Aktiengesellschaft, Stuttgart (DE)

(72) Inventor: Ralf Bauer, Neckarsulm (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 688 days.

(21) Appl. No.: 18/101,801

(22) Filed: Jan. 26, 2023

(65) Prior Publication Data

US 2023/0261274 A1 Aug. 17, 2023

(30) Foreign Application Priority Data

Feb. 17, 2022 (DE) ..................... 10 2022 103 712.6

(51) Int. Cl.

| | |
|---|---|
| *H01M 10/00* | (2006.01) |
| *B60L 50/64* | (2019.01) |
| *B60L 58/10* | (2019.01) |
| *G01J 5/0813* | (2022.01) |
| *G01J 5/10* | (2006.01) |
| *H01M 10/48* | (2006.01) |
| *H01M 50/124* | (2021.01) |
| *H01M 50/131* | (2021.01) |
| *H01M 50/209* | (2021.01) |

(52) U.S. Cl.

CPC ........... *H01M 10/486* (2013.01); *B60L 50/64* (2019.02); *B60L 58/10* (2019.02); *G01J 5/0813* (2022.01); *G01J 5/10* (2013.01);

*H01M 10/482* (2013.01); *H01M 50/1245* (2021.01); *H01M 50/131* (2021.01); *H01M 50/209* (2021.01); *G01J 2005/106* (2013.01); *H01M 2220/20* (2013.01)

(58) Field of Classification Search
CPC .. H01M 10/486; H01M 10/482; H01M 10/48; H01M 10/0525; G01J 5/10
See application file for complete search history.

(56) References Cited

U.S. PATENT DOCUMENTS

2019/0320717 A1* 10/2019 Tabasso ................ H02J 7/0042
2022/0144094 A1* 5/2022 Fuchs ..................... B60L 50/64

FOREIGN PATENT DOCUMENTS

| | | | |
|---|---|---|---|
| DE | 102013217039 A1 | 3/2015 |
| DE | 102018118562 A1 | 2/2020 |
| DE | 102019113065 A1 | 11/2020 |

* cited by examiner

*Primary Examiner* — Tiffany Legette
*Assistant Examiner* — Douglas C Marroquin
(74) *Attorney, Agent, or Firm* — Buchanan Ingersoll & Rooney PC

(57) ABSTRACT

A traction battery for an electrically or semi-electrically driven vehicle. The traction battery includes at least one temperature sensor. The temperature sensor is configured as an infrared sensor and includes a sensor array having several sensor elements for spatially resolved detection of the temperature of a surface of one or more components of the traction battery. A deflection optic is arranged between the respective surface and the sensor array, via which optic the temperature sensor detects the respective surface.

17 Claims, 2 Drawing Sheets

TRACTION BATTERY FOR AN ELECTRICALLY OR SEMI-ELECTRICALLY DRIVEN VEHICLE

CROSS-REFERENCE TO RELATED APPLICATION

This application claims priority to German Patent Application No. 10 2022 103 712.6, filed Feb. 17, 2022, the content of such application being incorporated by reference herein in its entirety.

FIELD OF THE INVENTION

The present invention relates to a traction battery for an electrically or semi-electrically driven vehicle.

BACKGROUND OF THE INVENTION

In electrically or semi-electrically driven vehicles, traction batteries that supply the necessary electrical energy are used in order to provide the electric drive of the vehicle.

Traction batteries often comprise temperature sensors that monitor the operating temperature of one or more components of the traction battery during operation. This is necessary, in particular, in order to operate a thermal management, i.e. to avoid overheating of components of the traction battery within the traction battery by means of a corresponding battery controller. This can be done, for example, by controlling the cooling accordingly.

Many battery systems or traction batteries have contact-based temperature sensors, such as Negative Temperature Coefficient Thermistors (NTC), which have a temperature-dependent resistance profile. It is disadvantageous in this contact-based temperature sensor that the temperature sensors are usually very small and can therefore only measure the temperature selectively or locally. Accordingly, such temperature sensors do not offer any indication of the temperature at any other location of the traction battery, for example, another location of the battery cell or battery module. The use of such contact-based temperature sensors is particularly disadvantageous on components of the traction battery that carry power, because these live components, for example power buses, have an electrical insulation, which reduces the thermal coupling of the temperature sensors to these components. In most cases, only very few temperature sensors are installed per battery module, whereby only a very insufficient indication of the electrical temperature in the battery module or the individual battery cells of the battery module is possible.

From the prior art, it is generally known to use infrared sensors for temperature measurement, so that a contact-free measurement of the temperature of components that are in the range of detection of the infrared sensor is possible. With such contact-free temperature sensors based on infrared radiation, only a clear line of sight between the temperature sensor and the location at which the temperature is to be detected is necessary. A temperature measurement of individual battery cells of a battery module by means of an infrared sensor, for example, is known from DE 10 2018 118 562 A1, which is incorporated by reference herein. The problem with the use of infrared sensors for temperature measurement is that, although such sensors themselves only have a very low design space requirement, this low design space requirement is associated with a rather low sensitive surface area of the sensor. Typically, such sensors have only a relatively small number of sensor elements, for example pixels, such that the active surface is relatively small. Accordingly, despite a possibly large sensor angle of the sensor, a relatively large distance between the infrared sensors and the component to be measured must be maintained in order to map a surface area of the component that is as large as possible on the sensor. As a result, large cavities in the traction battery are necessary, thereby reducing the packing density of the battery and thus increasing the design space required for the traction battery. Generally, the number of infrared sensors can be increased in order to increase the total surface area detected by the use of several infrared sensors, but this would result in additional costs and additional assembly effort.

SUMMARY OF THE INVENTION

Described herein is a traction battery for an electrically or semi-electrically driven vehicle, wherein the traction battery comprises at least one infrared sensor, wherein the traction battery has a particularly low design space requirement.

In the traction battery according to aspects of the invention, it is provided that the traction battery comprises at least one temperature sensor, wherein the temperature sensor is configured as an infrared sensor and comprises a sensor array having several sensor elements for spatially resolved detection of the temperature of a surface of one or more components of the traction battery, wherein a deflection optic is arranged between the respective surface and the sensor array, via which optic the temperature sensor detects the respective surface.

Through the use of a deflection optic, the respective surface is mapped on the sensor array via the deflection optic, so that it is not necessary to provide a particularly large amount of clearance directly between the surface to be measured and the sensor, because, due to the deflection optic, an optical axis of the temperature sensor does not have to be directly located on the surface or component to be measured. This allows the infrared sensor to be positioned relatively freely in the traction battery and also positioned at a small distance from the surface to be measured. The use of a deflection optic also increases the beam path from the surface to be measured and the sensor, such that, due to the extended beam path from the sensor array to the surface to be measured, a larger area of the surface of the component or the plurality of components is mapped on the sensor array. As a result, with one or a few infrared sensors, a large surface area of components of the traction battery can still be detected. This saves space and thus enables a very compact design of the traction battery.

The optical components used are optical components for the wavelength range of infrared radiation. The wavelength range is, for example, 780 nm to 1 mm.

It is considered particularly advantageous when the deflection optic comprises a mirror or is formed by a mirror. The use of a mirror, namely an infrared mirror, is a particularly simple method of realizing a deflection of the beam path. It is quite conceivable that the mirror is configured as a concave curved mirror, so that in addition to the deflection of the beams on the mirror, the optical mapping of the surface on the sensor is also influenced. However, the mirror is preferably configured as a plane mirror. It is also quite conceivable that the mirror is formed convexly curved.

It is considered particularly advantageous when the mirror is formed as a metal foil mirror. Such a metal foil mirror can be produced particularly simply and inexpensively.

It is considered particularly advantageous when the mirror is metallically coated. For example, the metallic coating can be an aluminum coating.

Preferably, the deflection optic is configured so as to cause a beam deflection of 70° to 110°. This type of deflection is considered advantageous in that, in traction batteries, surfaces that face in a vehicle vertical direction are often relevant, but a particularly small dimension of the traction battery is desirable, especially in the vehicle vertical direction, so that the vehicle is constructed as low as possible in the vertical direction. By contrast, in the vehicle longitudinal direction and/or in the vehicle transverse direction, there are usually enough clearances in the traction battery, such that a beam path can be achieved there from the surface to the sensor array via the deflection optic without interference objects falling in the beam path. This is particularly advantageous when the infrared sensor is intended to detect the temperatures of battery cells of a battery module, because the individual battery cells of a battery module are typically arranged in series in a stacked manner in the vehicle transverse direction or in the vehicle longitudinal direction, so that the surfaces of the battery cells can be particularly easily detected in the vehicle vertical direction by means of an infrared sensor.

It is considered particularly advantageous when the temperature sensor comprises a mapping optic for mapping the surface to be measured on the sensor array, wherein the deflection optic is arranged between the mapping optic of the temperature sensor and the respective surface. Preferably, the mapping optic is an integral part of the temperature sensor and/or directly attached to the temperature sensor.

It is considered particularly advantageous when the mapping optic is configured as a convergent lens.

It is considered particularly advantageous when the deflection optic is spaced apart from the temperature sensor and/or any mapping optic of the temperature sensor. This has the advantage that the deflection optic and the temperature sensor can be mounted and adjusted independently from one another.

It is considered particularly advantageous when the deflection optic consists of only a single mirror.

It is considered particularly advantageous when the respective component is formed by one of the following components:

a battery cell,
a battery module, wherein the battery module comprises several interconnected battery cells,
a module connector,
a contactor,
a power bus,
a connector,
a current sensor,
a fuse.

Preferably, the infrared sensor is adapted so as to detect the temperature of the surfaces of several battery cells of a battery module, often referred to as a battery cell module. In this context, it is considered particularly advantageous when the infrared sensor is arranged in the vehicle vertical direction above the battery cells of the battery module and the deflection optic, in particular a mirror of the deflection optic, is also arranged above the battery cells.

It is considered particularly advantageous when the traction battery comprises a battery module having several battery cells, wherein the battery module comprises a battery module housing, wherein the battery cells are arranged so as to be stacked one behind the other in a stacking direction in the battery module housing, wherein the temperature sensor detects the temperature of the respective surface of one or more of the battery cells via the deflection optic, wherein the temperature sensor and the deflection optic are arranged in the battery module housing. Because the beam path is deflected due to the optic, the temperature sensor can be placed at a particularly small distance from the surfaces to be measured, and still a particularly large surface is detected. This allows the deflection optic and infrared sensor to be positioned a short distance away from the battery cells.

It is also quite conceivable that the traction battery comprises a battery module having several battery cells, wherein the battery module comprises a battery module housing, wherein the battery cells are arranged so as to be stacked one behind the other in a stacking direction in the battery module housing, wherein the temperature sensor detects the temperature of the respective surface of one or more of the battery cells via the deflection optic, wherein the temperature sensor and the deflection optic are arranged outside of the battery module housing, wherein the battery module housing comprises one or more measurement openings, wherein these measurement openings are permeable to infrared beams. Accordingly, both the deflection optic and the infrared sensor are positioned outside the housing of the battery module, wherein the surface of the battery cells arranged within the battery module housing can still be detected due to the measurement openings.

It is quite conceivable that the openings are closed with a measurement window, wherein this measurement window is permeable to infrared radiation. Thereby, despite the provision of the measurement openings, the battery module housing can be hermetically sealed.

It is considered particularly advantageous when the infrared sensor is arranged such that an optical axis of the infrared sensor runs parallel or approximately parallel to the stacking direction of the battery cells. The sensor can thus be arranged perpendicular to the stacking direction at a particularly small distance from the battery cells and still achieve a long beam path. In the present case, an angular deviation of less than or equal to 5° is in particular understood to be approximately parallel.

It is considered particularly advantageous when the temperature sensor detects the temperature of the respective surfaces of all battery cells of the battery module via the deflection optic.

It is considered particularly advantageous when the optimal shape of the deflection mirror is determined using simulation software, for example ray-tracing simulation.

Geometrical distortions of the mapping by the optic, in particular the deflection optic, can be corrected with software, if necessary. It is quite conceivable for the output data of the infrared sensor to be transmitted to an evaluation electronic system, wherein the output data is corrected with software stored in the evaluation electronic system.

In order to avoid falsification of the surface temperatures measured by the temperature sensor, it is considered particularly advantageous when the surface of the component detected by the temperature sensor is provided with a coating, wherein a material of the coating has a higher emissivity than the coated material, wherein preferably the material of the coating has a predetermined emissivity of more than 0.8, preferably more than 0.9, in the area of the infrared spectrum relevant to the infrared sensor. A targeted oxidizing, in particular an anodizing of the surface, is also conceivable.

With respect to the deflection optic, it is also conceivable that the deflection optic comprises components made of an infrared-refracting material.

It is considered particularly advantageous when the infrared sensor is sensitive in the far infrared range, being sensitive in a wavelength range of 15 µm to 1 mm.

It is quite conceivable that the traction battery comprises several infrared sensors and a deflection optic associated with the respective infrared sensor.

It is quite conceivable that a single infrared sensor detects multiple battery modules, in particular multiple battery cells from different battery modules.

It is considered particularly advantageous when the sensor array is configured as a two-dimensional array, having rows and columns of sensor elements.

It is considered particularly advantageous when the sensor comprises at least 768 sensor elements, preferably pixels. It is considered particularly advantageous when the sensor array comprises at least 32×24 sensor elements/pixels.

BRIEF DESCRIPTION OF THE DRAWINGS

In the following figures, the invention is explained in further detail with reference to embodiment examples, without being limited thereto. Here.

DETAILED DESCRIPTION OF THE INVENTION

In FIGS. 1 to 4, the invention is only shown schematically for reasons of better understanding. The size ratios of the components shown in the figures do not correspond to reality. If the components were to be correctly represented, i.e. with correctly reproduced size ratios, the understanding of the present invention would be more difficult, so that such a representation is omitted.

Figure 1:
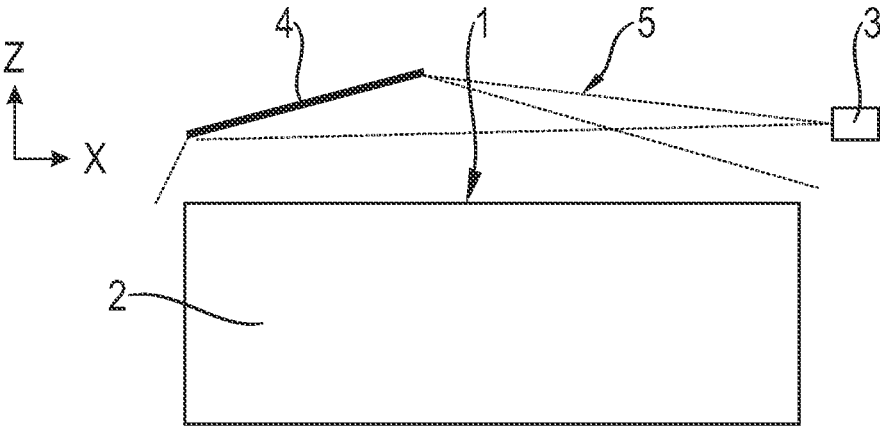
FIG. 1 shows an embodiment of the invention in a schematic representation.

FIG. 1 shows a traction battery, wherein said traction battery shows an arrangement for measuring the temperature of a surface 1 of a battery module 2 of the traction battery formed in the vehicle vertical direction Z. To measure the temperature of the surface 1 of the battery module 2, the traction battery comprises a temperature sensor, wherein this temperature sensor is, in the present case, configured as an infrared sensor 3, thus detecting the infrared radiation radiated from the surface 1. By means of an electronic evaluation system, not shown in greater detail, the temperature of the surface 1 and thus the battery module 2 can be adjusted based on the measured infrared radiation. In order to achieve a spatially resolved detection of the temperature of the surface 1, the infrared sensor 3 comprises a sensor array having several sensor elements. In the present case, the sensor elements are arranged in a 2D matrix arrangement.

The infrared sensor 3 is not aimed directly at the surface 1 of the battery module 2, but rather a deflection optic is arranged between the infrared sensor 3 and the surface 1, wherein this deflection optic is, in the present case, formed by an infrared mirror 4. In the present case, the deflection mirror 4 causes a deflection of the beam path 5 by approximately 90°. Accordingly, an optical axis of the infrared sensor 3 is configured in the vehicle longitudinal direction X, wherein, by the deflection of the beam path 5 on the deflection mirror 4, the surface 1 facing in the vehicle vertical direction Z is mapped onto the sensor array of the infrared sensor 3.

Figure 2:
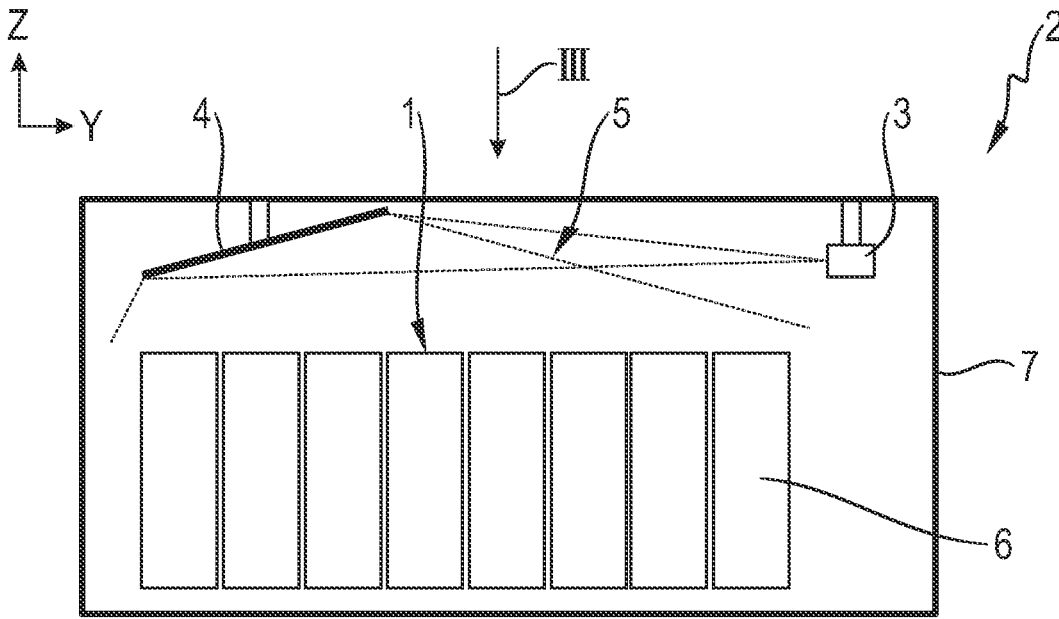
FIG. 2 shows a second embodiment of the invention in a schematic representation in a view according to arrow II in FIG. 3.
Figure 3:
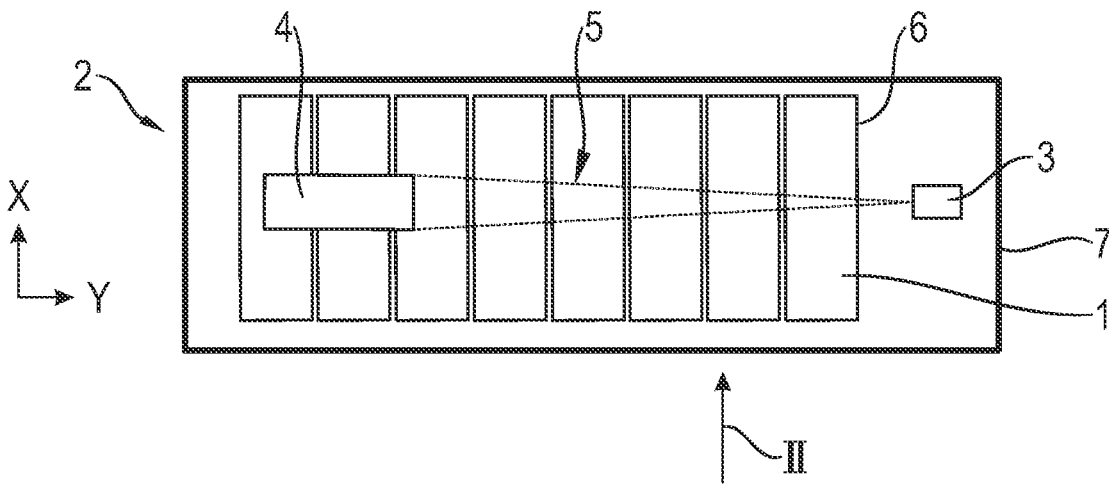
FIG. 3 shows the second embodiment of the invention in a schematic representation in a view according to arrow III in FIG. 2.

FIGS. 2 and 3 show a further embodiment of the invention in a schematic view, wherein, in this embodiment, the surfaces 1 of several battery cells 6 of a battery module 2 are detected by means of the infrared sensor 3. The battery cells 6 are arranged one behind the other arranged in a stacked manner in the vehicle transverse direction Y, as shown schematically in FIGS. 2 and 3. The battery cells 6 are arranged in a battery module housing 7 of the battery module 2, wherein both the infrared sensor 3 and the deflection mirror 4 are also arranged in the battery module housing 7. In the present case, the infrared sensor 3 and the mirror 4 are mounted on the inside of an upper housing wall of the battery module housing 7.

Figure 4:
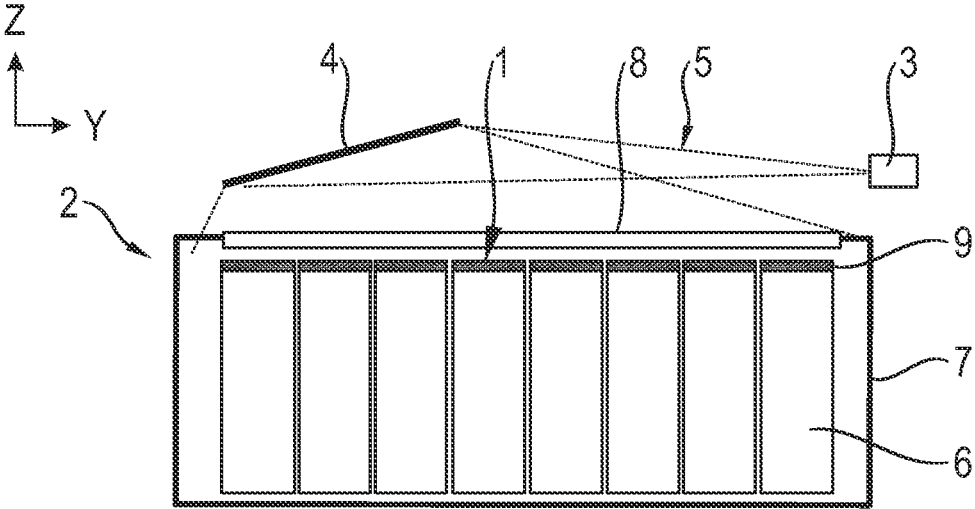
FIG. 4 shows a further embodiment of the invention in a schematic representation.

FIG. 4 shows a further embodiment of the invention in a schematic representation, wherein this embodiment differs substantially from the embodiment shown in FIGS. 2 and 3 in that the mirror 4 and the infrared sensor 3 are arranged outside of the battery module housing 7. For example, the mirror 4 and the infrared sensor 3 can be mounted on a battery housing, not shown in detail, of the traction battery. To enable a measurement of the surfaces 1 of the battery cells 6, the module housing 7 has a measurement opening, wherein this measurement opening is closed by a measurement window 8, wherein this measurement window 8 is permeable to infrared radiation in the wavelength range detectable by the infrared sensor 3. Furthermore, the surface 1 of the respective battery cell 6 detected by the infrared sensor 3 is provided with a coating 9, which has an emissivity of greater than 0.8 in the range of the infrared spectrum that is relevant to the infrared sensor 3 and, accordingly, has a higher emissivity than the coated material of the respective cell 6.

LIST OF REFERENCE NUMBERS

1 Surface
2 Battery module
3 Infrared sensor
4 Mirror
5 Radiation path
6 Battery cells
7 Battery module housing
8 Measurement window
9 Coating

What is claimed is:

1. A traction battery for an electrically or semi-electrically driven vehicle, wherein the traction battery comprises:
   a battery module housing having an interior region bounded by interconnected walls, said interconnected walls including a top wall,
   at least one temperature sensor in the form of an infrared sensor that includes a sensor array having several sensor elements for spatially resolved detection of a temperature of a surface of one or more components of the traction battery, and
   a deflection optic arranged in the interior region of the battery module housing and above the surface,
   wherein the temperature sensor detects the temperature of the surface via the deflection optic,
   wherein the deflection optic and the infrared sensor are arranged in the interior region of the battery module housing and are each suspended from the top wall of the housing and spaced apart from the top wall of the housing, wherein an optical axis of the infrared sensor is arranged in a longitudinal direction of the vehicle, and wherein the deflection optic is angled relative to the top wall and the optical axis of the infrared sensor.

2. The traction battery according to claim 1, wherein the deflection optic is configured so as to cause a beam deflection of 70° to 110°.

3. The traction battery according to claim 1, wherein the temperature sensor comprises a mapping optic for mapping the surface to be measured onto the sensor array.

4. The traction battery according to claim 1, wherein the one or more components of the traction battery is selected from a group consisting of:

a battery cell, a battery module comprising several interconnected battery cells, a module connector, a contactor, a power bus, a connector, a current sensor, and a fuse.

5. The traction battery according to claim 1, wherein the surface of the component detected by the temperature sensor includes a coating, wherein a material of the coating has a higher emissivity than the coated material, wherein the material of the coating has a predetermined emissivity of more than 0.8 in an area of the infrared spectrum relevant to the infrared sensor.

6. A motor vehicle comprising the traction battery of claim 1.

7. The traction battery according to claim 1, wherein the deflection optic is angled obliquely relative to the top wall and the optical axis of the infrared sensor.

8. The traction battery according to claim 1, wherein the deflection optic and the infrared sensor are spaced apart from each other in the longitudinal direction of the vehicle.

9. The traction battery according to claim 1, wherein the infrared sensor is aimed at the deflection optic.

10. The traction battery according to claim 9, wherein the optical axis is not aimed at the top wall or the surface.

11. The traction battery according to claim 1, wherein the deflection optic comprises a mirror or is formed by a mirror.

12. The traction battery according to claim 11, wherein the mirror is configured as a metal foil mirror.

13. The traction battery according to claim 11, wherein the mirror is metallically coated.

14. The traction battery according to claim 1, wherein the traction battery comprises a battery module having several battery cells, wherein the battery cells are arranged so as to be stacked one behind the other in a stacking direction (Y) in the battery module housing.

15. The traction battery according to claim 14, wherein the infrared sensor is arranged such that the optical axis of the infrared sensor runs either parallel or approximately parallel to the stacking direction (Y) of the battery cells.

16. The traction battery according to claim 14, wherein the temperature sensor detects the temperature of the respective surface of all battery cells of the battery module via the deflection optic.

17. The traction battery according to claim 14, wherein the stacking direction (Y) is oriented in said longitudinal direction of the vehicle.

* * * * *